April 23, 1957 E. C. KIEL ET AL 2,789,403
RADIUS GRINDING FIXTURE
Filed Nov. 12, 1954 2 Sheets-Sheet 1

INVENTOR.
EDWARD C. KIEL
HERMAN N. FORBAS
GILBERT R. FORBAS
BY Daniel J Cullen
ATTORNEY April 23, 1957  E. C. KIEL ET AL  2,789,403
RADIUS GRINDING FIXTURE
Filed Nov. 12, 1954  2 Sheets-Sheet 2

INVENTOR.
EDWARD C. KIEL
HERMAN N. FORBAS
BY GILBERT R. FORBAS

Daniel J. Cullen
ATTORNEY

United States Patent Office 2,789,403
Patented Apr. 23, 1957

2,789,403

RADIUS GRINDING FIXTURE

Edward C. Kiel, Herman N. Forbas, and Gilbert R. Forbas, Detroit, Mich.

Application November 12, 1954, Serial No. 468,328

3 Claims. (Cl. 51—224)

This invention relates to radius grinding fixtures and more particularly to a fixture adapted to hold and move a tool bit insert relative to a grinding wheel to form predetermined radii on the edges of said insert.

The use of tool bit inserts formed of hard material, such as carbides, to cut work pieces during manufacturing processes has become quite common in industry. These inserts are also commonly used to cut inside corners in work pieces, and therefore, they are formed by the manufacturer with sharp edges, and are fabricated in various cross-sectional shapes such as diamond, rectangular, and triangular shapes.

In forming inside corners in work pieces, it is the usual practice to form a fillet or rounded edge in such corners for the purposes of reducing stress. Accordingly, the users of the above mentioned inserts generally round the edges of such inserts to correspond to the concave radii of any fillet desired. However, because of the hardness of the insert, it is necessary to grind them with special grinding wheels such as the diamond type. Moreover, since the inserts vary in shape and since various radii are desired, these inserts are usually manually ground. This grinding operation is time consuming and expensive since it is necessary to employ skilled labor to perform such operation.

One problem which arises in grinding these inserts is that it is extremely difficult to obtain a uniform rounded radius on one corner of an insert. It is infinitely more difficult to obtain uniform rounded radii of the same dimensions on all the corners of the insert as is frequently desired.

In addition, in grinding inserts, it frequently happens that the grinding wheel undercuts the external walls of the insert between the corners due to the rotary motion of the insert relative to the grinding wheel. Where undercutting occurs, it is necessary to grind the walls flat again which thereby results in slight changes in the radius of the edges ground.

Thus, it is an object of our invention to provide a radius grinding fixture adapted to hold an insert against a grinding wheel to enable an unskilled person to quickly grind an accurate predetermined radius upon any one or all of the corners of such insert.

It is a further object of our invention to provide a fixture capable of accurately positioning an insert relative to a grinding wheel and to locate said insert relative to said grinding wheel to obtain a uniform radius on each of the corners of such insert.

Another object of our invention is to provide an inexpensive manually operated fixture which can be fastened to the bed of an ordinary grinding machine so as to enable an unskilled person to accurately grind any desired radius on the corners of the insert with the wheel of the grinding machine.

Yet another object of our invention is to provide a radius grinding fixture having means to hold an insert and wherein such means may be adjusted in order to obtain any predetermined radius on the corners of such insert.

Still a further object of our invention is to provide a fixture having various size insert holders which are shaped to hold different size and different shaped inserts whereby the corners of said inserts may be quickly and accurately ground.

An additional object of our invention is to provide a fixture having an insert holder wherein said insert may be quickly seated within said holder and held therein by a releasable locking means, so that said insert may be ground one edge at a time.

These and other objects of our invention will become apparent upon reading the following specification of which the attached drawings form a part.

Referring to the drawings.

Figure 1:
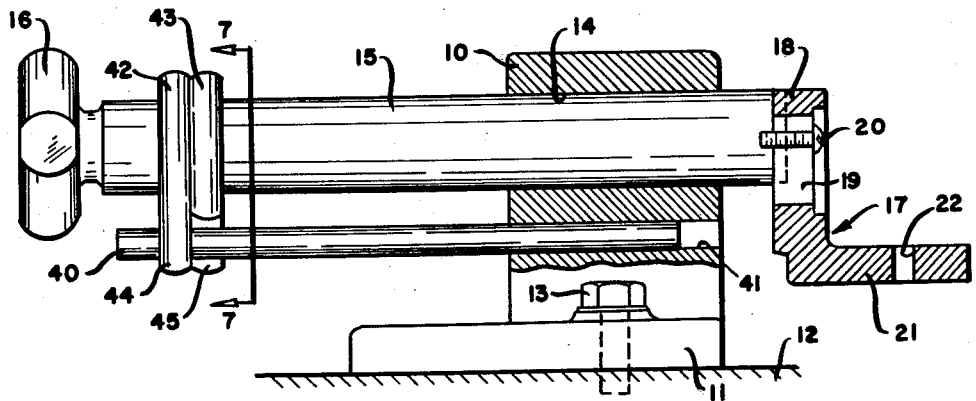
Figure 1 illustrates a preferred form of our grinding fixture partially in cross-section.
Figure 2:
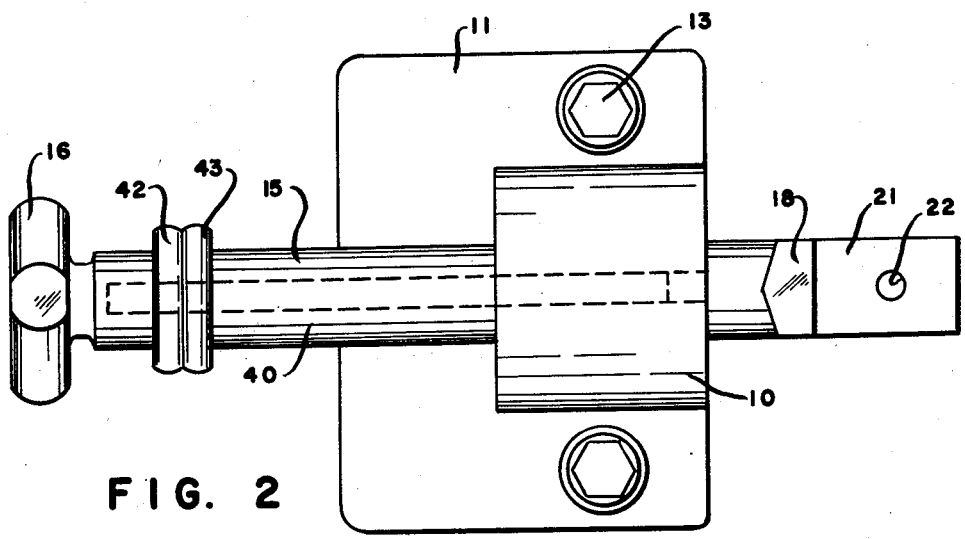
Figure 2 is a top view of the fixture shown in Figure 1.

The device illustrated in the drawings comprises, essentially, a shaft which is both rotatable and slidably mounted. On one end of the shaft a means is provided to hold an insert holder. In addition, a means is provided to limit the rotation of the shaft.

Figure 9:
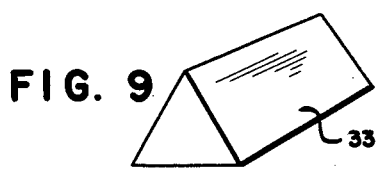
Figure 9 shows a triangular cross-section insert before the grinding operation.
Figure 10:
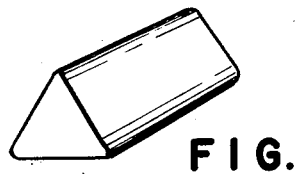
Figure 10 illustrates the same insert after the grinding operation.

Referring briefly to Figure 9, we have shown a typical triangular in cross-section insert as it is received from the tool manufacturer. In order to use this tool to cut inside corners having fillets, the edges are rounded into the form shown in Figure 10.

The fixture adapted to hold these inserts consists of first a support 10, having a base 11 which is adapted to be fastened to the bed 12 of a grinding machine or the like, by means of bolts 13 or some similar type fastening means. Through the support a bore 14 is formed, and inserted within the bore is a shaft 15. This shaft may be rotated within the bore and may also be axially slid therethrough.

On one end of the shaft there is formed a handle 16 which is manually grasped to turn and slide said shaft. On the opposite end of the shaft, a bracket 17 is positioned. This bracket consists of an upright portion 18 having a slot 19 formed therein. Slot 19 is arranged in a substantially vertical direction.

In order to fasten the bracket to the shaft, a screw 20 may be inserted into the slot 19 and then threaded into an opening in the shaft end. In this manner, the bracket may be vertically adjusted relative to the shaft end by loosening the screw and then raising or lowering the bracket after which the screw is tightened. Also formed on the bracket is a leg 21 within which an opening 22 is formed. This leg serves to support the insert holder 23 (see Figures 3 and 4) as explained hereafter.

Figure 3:
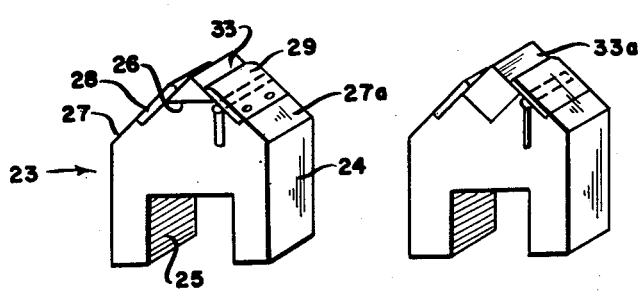
Figure 3 illustrates an insert holder shown isometrically.
Figure 4:
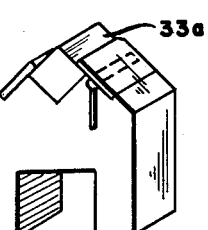
Figure 4 is an isometric view of a modification of the holder of Figure 3.
Figure 5:
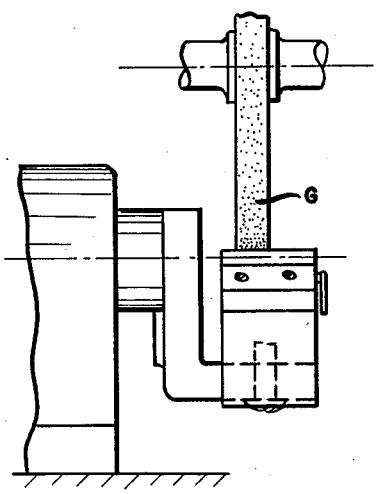
Figure 5 illustrates the holder mentioned above mounted upon the grinding fixture and shows the relative positioning of a grinding wheel.
Figure 6:
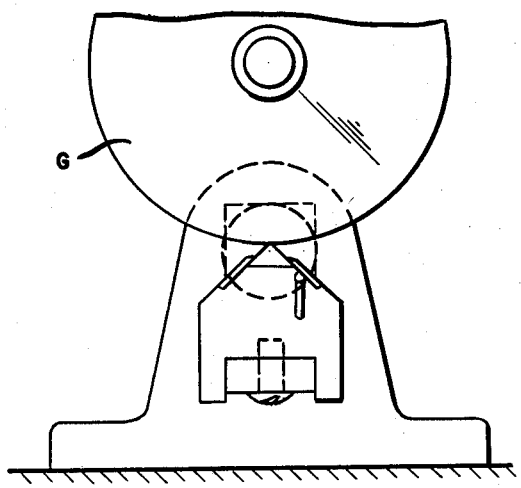
Figure 6 is a front view of the illustration of Figure 5.

Referring to Figure 3 wherein is illustrated one typical insert holder, note that the holder comprises a body 24 having a channel 25 formed in the base thereof. This channel 25 is arranged so that the leg 21 of bracket 17 may be inserted therein and rigidly fastened therein by means of a screw or the like passing through hole 22 into an aligned opening in the base of the channel 25.

The upper portion of the tool holder is flattened at 26 to form the base of an insert seat. A portion of the slanting upper walls 27 and 27a of the insert holder is cut away so that a rigid metallic strip 28 may be fastened in one of the cut away portions and a resilient strip 29 may be fastened in the other cut away portion. As can be seen in Figure 3 the two strips 28 and 29 extend upwardly beyond the seat base 26 to form the side walls of an insert holding channel.

Figure 8:
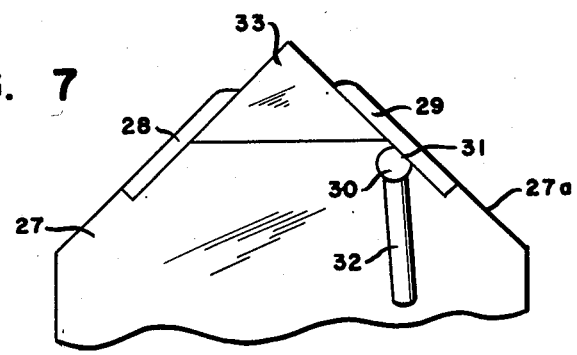
Figure 8 is an enlarged view of a portion of an insert holder and illustrates the releasable locking means.

Referring to Figure 8, a rod 30 is located in a corresponding channel formed in the side wall 27a of the insert holder. One portion of the rod 31 is flattened so as to bear against the resilient strip 29. A handle 32 is attached to rod 30 enabling the rod to be rotated so as to cam the strip 29 outwardly thereby enlarging the insert receiving channel. Within this channel, an insert 33 may be slid along the length of the channel until properly positioned. Once positioned, the handle 32 is rotated until the flat portion 31 contacts strip 29 which at that point tightly presses against the insert 33.

In describing the insert holder, it must be realized that the insert may come in various sizes as well as various shapes. Thus in Figure 4, where a diamond or rectangular shaped insert 33a is shown, the seat formed in the insert holder is made to correspond to the external shape of the insert.

Where larger or smaller inserts are used, different insert holders are also used to correspond to each one of these sizes.

In operation, where the insert holder straddles the leg 21 of the bracket affixed to shaft 15, the bracket is raised or lowered until the edge of the insert which is desired to be ground is aligned with the axis of the shaft. Then the bracket is further raised until the axis of the desired radius is in alignment with the shaft axis. At this point, the grinding wheel is brought into contact with such edge. Then, the insert is both rotated and slid axially relative to the grinding wheel to form a rounded radius throughout its entire edge. This rotation and shaft sliding is accomplished manually by twisting handle 16 and by pushing it inwardly and outwardly during the twisting action.

If the shaft were rotated too much, the grinding wheel would not only grind the edge of the insert but would also dig into the side walls of such insert and cause damage thereto which would necessitate regrinding the side walls in order to obtain a true radius. Thus to eliminate this possibility a limiting means is provided on this device whereby the rotation of the insert is limited to a predetermined number of degrees.

Figure 7:
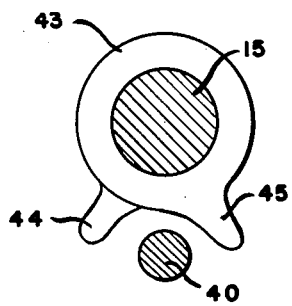
Figure 7 is a view taken on line 7—7 of Figure 1.

The limit mechanism illustrated in Figure 1 comprises a shaft 40 which is fitted within an opening 41 in support 10. This shaft is rigidly held within said opening and extends substantially parallel to the axis of shaft 15. Upon shaft 15 a pair of collars 42 and 43 are mounted and these collars carry arms 44 and 45 respectively. The arms are set at such an angle so that the desired rotation of the insert may be obtained between the point where arm 44 contacts shaft 40 and where arm 45 contacts shaft 40. Attention is directed to Figure 7 wherein the angular setting of the arms relative to shaft 15 is shown.

As can be seen, our radius grinding fixture is very simply and inexpensively constructed and yet will yield a uniform radius edge on any one of the edges of the insert. Thus after one edge is ground, the insert is removed from the insert holder by simply twisting handle 32 to cam out spring strip 29, after which the insert is slid out and then turned so that the next edge to be ground faces upwardly. This step is repeated until all the edges are ground.

The radius selected may be obtained by simply lowering the grinding wheel relative to the shaft 15 axis so that the grinding wheel will take off more or less material from the insert as desired. Such movement of the grinding wheel is affected by the ordinary feed mechanism on the grinding machine.

It is to be understood that the structure described above may lend itself to certain modifications within the scope of our invention. Thus, other types of adjustment means may be provided between the bracket and the shaft 15, so long as these adjustments produce the same results as that produced by our screw and slot structure. In addition, other types of limiting means may be utilized and if desired rotation of and sliding motion of shaft 15 may be obtained by means of a mechanical rather than a manual means.

This invention may be developed within the scope of the following claims, without departing from the essential features thereof. Accordingly, it is desired that the above description be read as being merely illustrative of one preferred embodiment rather than in a strictly limiting sense.

We claim:

1. A radius grinding fixture comprising a support having a shaft supporting bore formed therein, a shaft journalled in said bore and being of greater length than the bore for axial back and forth sliding motion with the bore, and said shaft being freely rotatable both clockwise and counter-clockwise in said bore, a second shaft extending from said support in a direction substantially parallel to said first shaft, arms formed on said first shaft and extending radially therefrom to form a predetermined angle between said arms, said arms being located on opposite sides of said second shaft, a bracket secured to one end of said shaft, said bracket having a leg extending therefrom in a direction substantially parallel to said shaft axis, a holding block rigidly secured to said leg, means on said block to rigidly hold an insert having an edge to be ground with said edge parallel to the shaft axis, whereby said edge may be reciprocated parallel to said shaft and rotated radially within the angle between said arms, with corresponding movement of said shaft.

2. A radius grinding fixture comprising a support, a bore extending through said support, a shaft inserted through said bore and being rotatable relative to said bore, said shaft being of greater length than the bore and being freely slidable back and forth within the bore, a second shaft secured to said support and extending in a direction substantially parallel to said first shaft, limit arms formed on said first shaft and extending radially therefrom with a predetermined angle between said arm, said arm being positioned on opposite sides of said second shaft, a bracket rigidly secured to one end of said shaft and being adjustable in height, a leg extending from said bracket, a holding block secured to said leg and having an insert holding means formed thereon, said insert holding means being formed to hold an insert having an edge to be ground, with the axis of the radius to be ground in axial alignment with said first shaft axis, whereby said edge may be reciprocated parallel to said shaft axis and rotated radially with corresponding movement of said first shaft.

3. A radius grinding fixture as defined in claim 2 above, wherein the top of said holding block is formed with an upwardly open groove shaped to correspond to the external shape of an insert whereby an insert may be positioned within said channel with the top of the insert extending above the groove, and releasable locking means adapted to hold an insert within said channel, said releasable locking means comprising a resilient plate formed as a side wall of said channel and arranged to clamp against the insert.

(References on following page)

References Cited in the file of this patent

UNITED STATES PATENTS

| | | |
|---|---|---|
| 146,528 | Harrington | Jan. 20, 1874 |
| 228,849 | Young | June 15, 1880 |
| 425,839 | Walker | Apr. 15, 1890 |
| 1,019,887 | Fowler | Mar. 12, 1912 |
| 2,128,762 | Weed | Aug. 30, 1938 |
| 2,362,306 | Ringzelli | Nov. 7, 1944 |
| 2,449,459 | Eckert | Sept. 14, 1948 |
| 2,470,530 | Stryhal | May 17, 1949 |
| 2,486,335 | Smith | Oct. 25, 1949 |
| 2,491,346 | Wetzel | Dec. 13, 1949 |
| 2,642,856 | Calloway | June 23, 1953 |